Figure 1:
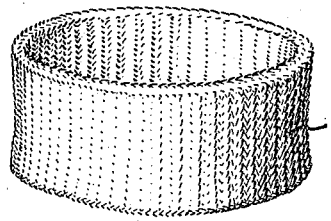

Dec. 7, 1926.

E. SLADE

FRICTION DISK AND THE METHOD OF MAKING SAME

Filed June 16, 1922

1,610,173

Edward Slade, Inventor

By his Attorney

Patented Dec. 7, 1926.

1,610,173

UNITED STATES PATENT OFFICE.

EDWARD SLADE, OF NEW YORK, N. Y.

FRICTION DISK AND THE METHOD OF MAKING SAME.

Application filed June 16, 1922. Serial No. 568,706.

My invention relates to a friction disk or similar structure such as may be used in friction clutches, as for instance the conventional dry plate clutch now widely used in motor vehicles, and aims to produce a structure of the kind described in a simple economical manner, and to avoid the weaknesses inherent in prior devices of this character.

In the manufacture of friction disks at the present time it is usual to proceed, either by cutting the disk from a flat piece of woven fabric, or, in the case of large disks, forming a strip into a substantially circular shape by joining the ends thereof. In the former case the resulting disk includes a large number of relatively short threads and necessarily has a raw edge which is likely to fray thus producing a structure which is of relatively little strength and has a relatively short life. In the latter case, the seam or other joining of the ends of the strip produces a point of weakness in the disk, and if the ends be over-lapped, an inequality in its thickness or density, or an inequality in the coating of impregnating material.

According to my invention, I form a friction disk, comprising a seamless body of textile material which is braided, and which is readily adapted to take the shape of the finished disk.

In the drawings which accompany this specification, I have shown the steps in the operation of forming the friction disks of my invention.

Figure 2:
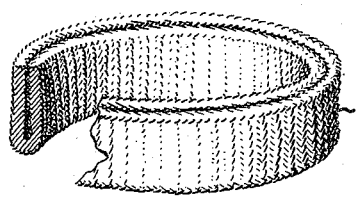
Figure 3:
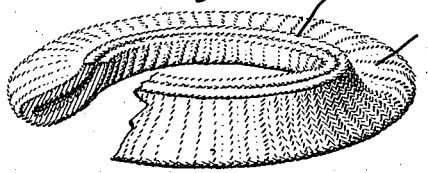

Figures 1, 2, and 3—relating to the formation of a disk of double thickness.

Figure 4:
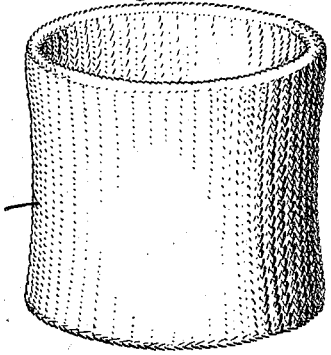
Figure 5:
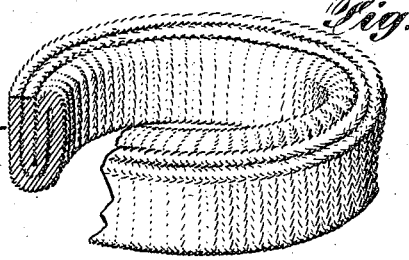
Figure 6:
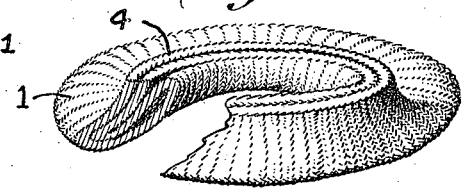

Figures 4, 5 and 6—relating to the formation of a disk of quadruple thickness.

Figure 7:
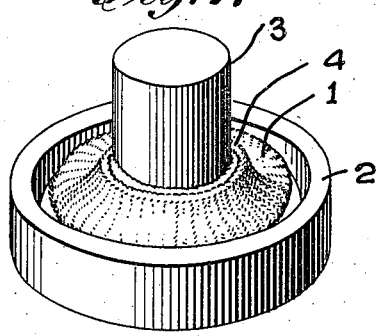
Figure 8:
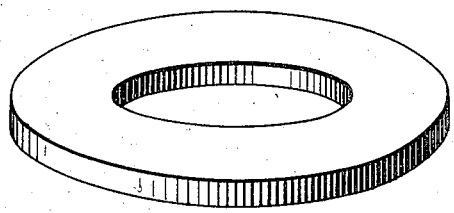

Figure 7—illustrating the method of inserting the material in the compressing die, and Figure 8—illustrating the completed product.

In the practice of my invention, I form a body of fibrous material, or fibrous material and metallic wire, as may be desired according to the conditions the finished disk is intended to meet, which body of material may be in the form of a seamless cylinder such as is formed upon a circular braiding machine. However, I do not wish to confine myself to this method of manufacture of the cylinder, since it obviously may be formed in flat or circular form; and if desired seamed or formed into cylindrical shape by wrapping a plurality of thicknesses of flat material into a cylindrical form.

The preferred embodiment of my invention includes a seamless braided cylinder made from a metallic wire covered with a fibrous substance, such as asbestos; or a seamless braided cylinder of alternating threads of asbestos and wire.

The cylinder having been formed is cut in suitable lengths as shown in Figs. 1 and 4, the cylinder illustrated in Fig. 1 being of a length adapted to form a disk of double thickness, and cylinder 4, being of a length to form a disk of quadruple thickness.

The cylinder is partially everted or folded over upon itself as shown in Figs. 2 and 5, this operation being easily performed because of the elastic character of the body of the material.

The cylinder, after having been folded over, as shown in Figs. 2 and 5, is then placed in the die as shown in Fig. 7; in which 1 represents the body of the material, 2 the exterior wall of the die, and 3 the interior wall or mandrel. When placed in the position shown in Fig. 7, the body of the material assumes the form shown in Figs. 3 and 6, and because of its elasticity it is easily stretched at its periphery, and contracted at its smaller diameter. It may then be impregnated with a suitable impregnating material such as a rubber or bituminous compound, applied in a liquid or plastic condition, and is then subjected to the pressure of the die. The male member of the die (not shown in the drawings) when brought into operation, contacts with the upstanding edge 4 of the body portion, as will be evident from Fig. 7, depressing it and thereby forcing the periphery of the body portion against the outer wall 2 of the die. The impregnating material having been vulcanized or otherwise suitably hardened, the finished disk, as shown in Fig. 8, is removed from the die.

It will be noted that my improved friction disk contains no short threads, no raw edges, and is of uniform structure and strength throughout. It also has no seams and the waste involved in cutting the disk blanks from a flat piece of material is also avoided.

While I have only shown one form of my invention, it will be obvious that many changes will be made without departing from its spirit, and I therefore do not wish to confine myself to the specific details shown and described.

I claim as my invention:

1. The method of making friction disks which comprises forming a cylindrical body of textile material, collapsing said cylinder into a flat form with the edges arranged inwardly and impregnating it with a suitable binder.

2. The method of making a friction disk which comprises forming a cylindrical body of textile material, folding said body upon itself, collapsing it to a flat form with the edges arranged inwardly and impregnating it with a suitable binder.

3. The method of forming a friction disk which comprises forming a seamless cylindrical body of braided wire and fibrous material, folding said body upon itself, collapsing it to a flat form with the edges arranged inwardly and impregnating it with a suitable binder.

4. The method of forming a friction disk which comprises forming a seamless cylindrical body from wire covered with asbestos, folding said body upon itself to form a plurality of thicknesses, collapsing it to form a flat shape with the edges arranged inwardly and impregnating it with a suitable binder.

5. A friction disk comprising a body composed of a seamless cylinder of textile material, folded upon itself and collapsed to form a plurality of thicknesses with the edges arranged inwardly and impregnated with a binder.

6. A friction disk comprising a body formed from a seamless cylinder of textile material composed of metallic wire and fibrous material folded upon itself to form a plurality of thicknesses with the edges arranged inwardly and impregnated with a binder.

In testimony whereof, I have signed my name to this specification this 13th day of June, 1922.

EDWARD SLADE.